(12) United States Patent
Konrad et al.

(10) Patent No.: US 7,670,507 B2
(45) Date of Patent: Mar. 2, 2010

(54) PHOSPHOR COMPOSITION FOR A LOW-PRESSURE DISCHARGE LAMP WITH HIGH COLOR TEMPERATURE

(75) Inventors: Armin Konrad, Großaitingen (DE); Martin Zachau, Geltendorf (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 206 days.

(21) Appl. No.: 11/547,068

(22) PCT Filed: Apr. 13, 2005

(86) PCT No.: PCT/DE2005/000666

§ 371 (c)(1), (2), (4) Date: Oct. 2, 2006

(87) PCT Pub. No.: WO2005/100508

PCT Pub. Date: Oct. 27, 2005

(65) Prior Publication Data

US 2008/0265207 A1    Oct. 30, 2008

(30) Foreign Application Priority Data

Apr. 16, 2004    (DE) .................. 10 2004 018 590

(51) Int. Cl.
C09K 11/78 (2006.01)
C09K 11/80 (2006.01)
C09K 11/81 (2006.01)
C09K 11/77 (2006.01)

(52) U.S. Cl. .................. 252/301.4 P; 252/301.4 R; 252/301.4 H; 313/487

(58) Field of Classification Search ............... 313/487; 252/301.4 P, 301.4 R, 301.4 H
See application file for complete search history.

(56) References Cited

U.S. PATENT DOCUMENTS

| 4,623,816 A | * | 11/1986 | Hoffman et al. ............ 313/487 |
| 4,847,533 A | | 7/1989 | Hoffman et al. |
| 5,156,764 A | | 10/1992 | Kaneda et al. |
| 5,166,456 A | | 11/1992 | Yoshino et al. |
| 5,471,113 A | * | 11/1995 | De Backer et al. ........ 313/487 |
| 5,714,836 A | * | 2/1998 | Hunt et al. ................ 313/487 |
| 5,854,533 A | * | 12/1998 | Pappalardo ............... 313/487 |
| 6,144,152 A | | 11/2000 | Van Der Voort et al. |
| 6,459,197 B1 | * | 10/2002 | Mori et al. ............... 313/487 |
| 6,794,810 B2 | | 9/2004 | Gruber et al. |
| 6,867,536 B2 | * | 3/2005 | Srivastava et al. ........ 313/487 |
| 6,992,432 B1 | * | 1/2006 | Jansma .................... 313/486 |
| 7,391,148 B1 | * | 6/2008 | Setlur et al. .............. 313/486 |
| 2003/0076029 A1 | * | 4/2003 | Gruber et al. ............. 313/486 |
| 2004/0113539 A1 | * | 6/2004 | Soules et al. ............. 313/487 |

FOREIGN PATENT DOCUMENTS

| DE | 100 58 852 | | 6/2002 |
| DE | 101 22 850 | | 11/2002 |
| DE | 10122850 | * | 11/2002 |
| EP | 1 274 120 | | 1/2003 |
| JP | 4-106188 | * | 4/1992 |
| JP | 4106188 A | | 4/1992 |
| JP | 528966 A | | 2/1993 |
| JP | 20023836 A | | 1/2002 |
| JP | 2003147350 A | | 5/2003 |
| JP | 2003193046 A | | 7/2003 |
| JP | 2004-127633 | * | 4/2004 |
| WO | WO 2004/021397 | | 3/2004 |

OTHER PUBLICATIONS

Translation for DE 10122850.*
Phosphor Handbook, Shionoya and Yen, ed., 1999, pp. 372-373.*
Abstract for JP 4-106188.*
English language abstract for JP528966, Feb. 5, 1993.
English language abstract for JP2003147350, May 21, 2003.
English language abstract for JP4106188, Apr. 8, 1992.
English language abstract for JP20023836, Jan. 9, 2002.

* cited by examiner

*Primary Examiner*—C. Melissa Koslow

(57) ABSTRACT

A phosphor composition for a low-pressure discharge lamp with a high light yield and a high color temperature contains phosphors which emit in the red wavelength region, including yttrium oxide doped with europium or gadolinium-zinc-magnesium pentaborate doped with cerium and manganese, phosphors which emit in the green wavelength region including lanthanum phosphate doped with cerium and terbium and/or cerium-magnesium aluminate doped with terbium and/or cerium-magnesium pentaborate doped with terbium, and optionally a phosphor which emits in the blue wavelength region of the barium-magnesium aluminate doped with europium type. The phosphor composition additionally contains at least one phosphor which emits in the blue or blue-green wavelength region selected from the group consisting of manganese-strontium-barium-magnesium aluminate doped with manganese and europium or barium-magnesium aluminate doped with europium and manganese and strontium aluminate doped with europium and strontium-barium-calcium chloroapatite doped with europium and strontium borophosphate doped with europium.

12 Claims, 1 Drawing Sheet

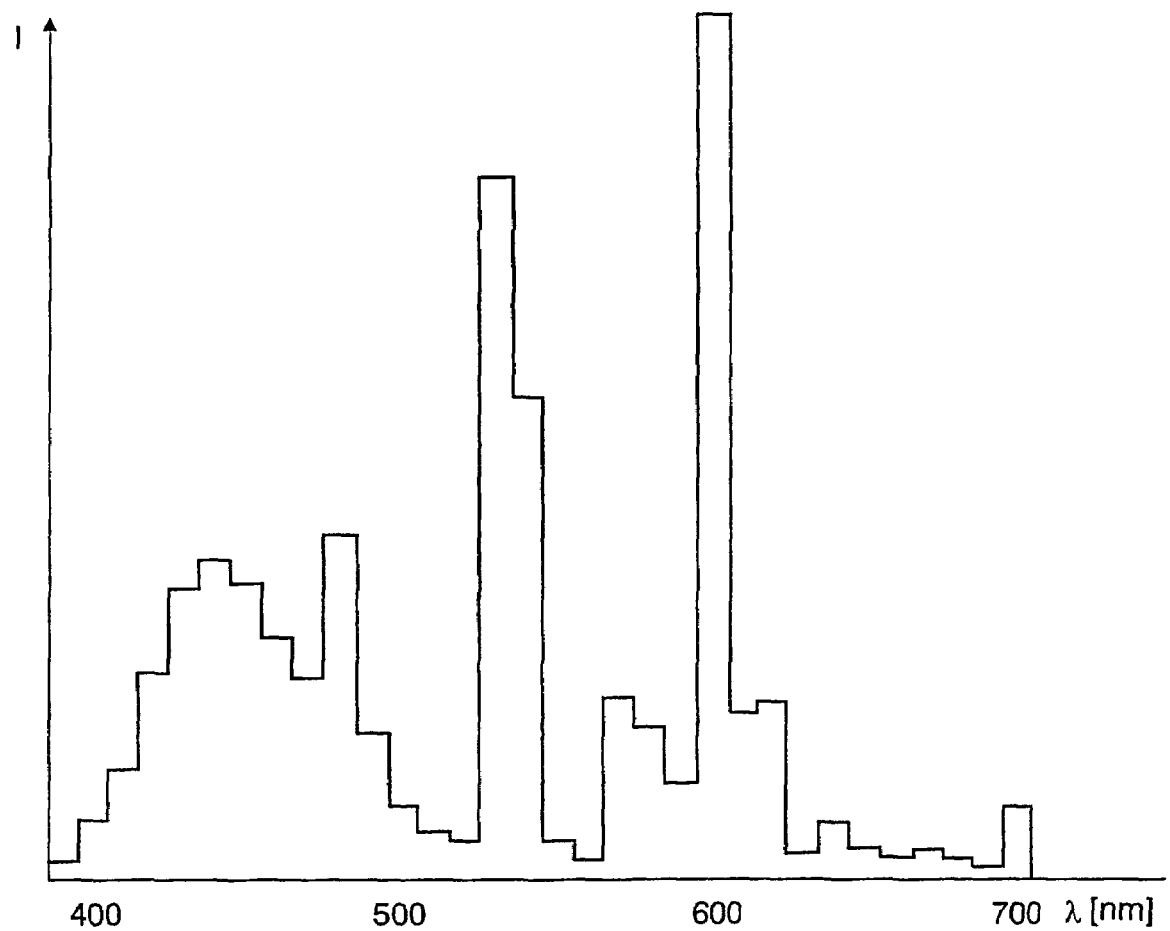

PHOSPHOR COMPOSITION FOR A LOW-PRESSURE DISCHARGE LAMP WITH HIGH COLOR TEMPERATURE

TECHNICAL FIELD

The invention is based on a phosphor composition for a low-pressure discharge lamp with a high light yield and a high color temperature. For this purpose, the phosphor composition includes phosphors which emit in the red wavelength region selected from the group consisting of yttrium oxide doped with europium and/or gadolinium-zinc-magnesium pentaborate doped with cerium and manganese, phosphors which emit in the green wavelength region selected from the group consisting of lanthanum phosphate doped with cerium and terbium and/or cerium magnesium aluminate doped with terbium and/or cerium-magnesium pentaborate doped with terbium, and optionally a phosphor which emits in the blue wavelength region of the barium-magnesium aluminate doped with europium type.

PRIOR ART

Users of low-pressure discharge lamps, whether these be fluorescent lamps or compact fluorescent lamps, have recently become increasingly interested in obtaining lamps which when they operate have the effect of stimulating the human body. Measurements have shown that the visible part of the electromagnetic spectrum also has physiological effects on the human body. In particular, it has emerged that the human eye contains receptors which are actively linked to the control of the hormone balance of the sleep hormone melatonin. These receptors are sensitive in particular in the blue region, with the maximum sensitivity approximately in the range from 450-470 nm.

Therefore, there has been a search for phosphor compositions which satisfy this requirement. At the same time, however, there should be no significant deterioration in the color rendering index of the fluorescent lamps that have been used hitherto. In addition to the requirement for a good color rendering, the luminous flux emitted by the lamp should also be as high as possible. The difficulty is that a high luminous flux and very good color rendering are contradictory demands, since a high luminous flux requires a maximum light intensity in the green, whereas good color rendering requires a distribution of the light intensity over all wavelengths that is similar to black body radiation, and therefore runs contrary to the first requirement.

SUMMARY OF THE INVENTION

This object is achieved with a phosphor composition for a low-pressure discharge lamp with a high light yield and a high color temperature, the phosphor composition including phosphors which emit in the red wavelength region selected from the group consisting of yttrium oxide doped with europium and/or gadolinium-zinc-magnesium pentaborate doped with cerium and manganese, phosphors which emit in the green wavelength region selected from the group consisting of lanthanum phosphate doped with cerium and terbium and/or cerium magnesium aluminate doped with terbium and/or cerium-magnesium pentaborate doped with terbium, and optionally a phosphor which emits in the blue wavelength region of the barium-magnesium aluminate doped with europium type, wherein said phosphor composition further comprises at least one phosphor which emits in the blue or blue-green wavelength region selected from the group consisting of barium-strontium-magnesium aluminate doped with manganese and europium, barium-magnesium aluminate doped with europium and manganese, strontium aluminate doped with europium, strontium-barium-calcium chloroapatite doped with europium, and strontium borophosphate doped with europium.

The basic concept of the invention consists in providing a low-pressure discharge lamp with an enhanced activating effect on the human body compared to a conventional low-pressure discharge lamp which is comparable in terms of its electrical data. This effect will be achieved by increasing the relevant blue component, which is in this case defined by the so-called circadian factor, which is used as a technical variable. This circadian factor describes the ratio of the activating component, determined by an assumed sensitivity curve, of the radiated power to the total luminous flux. In this context, the luminous flux is the radiation power evaluated using the spectral visual sensitivity (with respect to the normal impression of brightness). It is therefore the ratio of two integrals over the radiation power, in one case with the weighting function of the circadian effect on the activating light receptors, and in the other case (in the case of the luminous flux) with the spectral brightness sensitivity of the human eye.

The term circadian factor and also the term luminous flux are technical variables used per se. For a more detailed definition of these terms, reference is made to Gall (Gall. D., "LICHT", edition 7-8, 2002). Nevertheless, it should be pointed out that the underlying physiological mechanisms depend on various parameters, i.e., for example, the dark-adapted eye reacts differently from the light-adapted eye. There are also different scientific viewpoints regarding details on the correct circadian efficiency distribution in the blue spectrum, in particular depending on the light/dark adaptation, but these will not be explained in more detail here.

The invention has the additional advantage that the lamp not only has a refreshing effect and enhances physical and spiritual well-being, but also is regarded subjectively by the user as being fresher. This is on account of the light being whiter because of the enhanced blue component. This allows the user to see and in particular read in greater contrast and with less fatigue and also enables fresher and more natural color rendering to be achieved. Therefore, in the invention the original functions of the low-pressure discharge lamp are not just maintained but even improved given a suitable design. In particular color temperatures of 8000 K and color rendering indexes $R_a$ of greater than 80 are preferred. Color temperatures of up to 20 000 K are even conceivable by the addition of corresponding blue phosphors. The color rendering index is likewise a variable which is in use and denotes the degree to which the surface color corresponds to its appearance and the illumination by the corresponding lamp. In this respect, color shifts for eight test colors standardized in the German industrial standard DIN 6169 are determined and a corresponding index value is calculated. A theoretical optimum lamp achieves a value of $R_a$=100.

Measurements have now shown that the addition of the manganese- and europium-doped manganese-strontium-barium-magnesium aluminate phosphor which emits in the blue wavelength region makes it possible to achieve a circadian factor of between 0.8 and 1.2.

To achieve a particularly high circadian factor combined, at the same time, with a color rendering index $R_a$ of greater than 80, the europium-doped yttrium oxide phosphor advantageously forms between 30 and 50% by weight, more preferably between 35 and 41% by weight.

If cerium- and manganese-doped gadolinium-zinc-magnesium pentaborate phosphor is added as red phosphor in addition to the europium-doped yttrium oxide phosphor, it is advantageous for the cerium- and manganese-doped gadolinium-zinc-magnesium pentaborate phosphor to form between 5 and 30% by weight of the phosphor composition.

The green phosphor component used is advantageously a phosphor or a combination of phosphors selected from the group consisting of lanthanum phosphate doped with cerium and terbium and/or cerium-magnesium aluminate doped with terbium and/or cerium-magnesium pentaborate doped with terbium. The cerium- and terbium-doped lanthanum phosphate phosphor should in this case form between 22 and 40% by weight, preferably between 30 and 34% by weight.

As blue phosphor component, it is optionally possible to use a europium-doped barium-magnesium aluminate phosphor, in which case the europium-doped barium-magnesium aluminate phosphor advantageously forms between 10 and 20% by weight, preferably between 13 and 17% by weight, of the overall phosphor composition.

As an additional blue or blue-green phosphor component, the phosphor composition additionally contains at least one phosphor selected from the group consisting of barium-strontium-magnesium aluminate doped with manganese and europium, barium-magnesium aluminate doped with europium and manganese, strontium aluminate doped with europium, strontium-barium-calcium chloroapatite doped with europium, and strontium borophosphate doped with europium.

The manganese- and europium-doped barium-strontium-magnesium aluminate phosphor in this case forms between 10 and 20% by weight, preferably between 13 and 17% by weight.

The europium- and manganese-doped barium-magnesium aluminate phosphor advantageously forms between 7 and 35% by weight, preferably between 10 and 30% by weight.

In the case of the europium-doped strontium aluminate phosphor, the europium-doped strontium aluminate phosphor should advantageously form between 3 and 15% by weight, preferably between 4 and 10% by weight.

In the case of the europium-doped strontium borophosphate phosphor, the europium-doped strontium borophosphate phosphor should preferably form between 3 and 15% by weight, more preferably between 4 and 10% by weight, of the phosphor composition.

It is also possible to use as a blue-green phosphor component of the phosphor composition a europium- and manganese-doped barium-magnesium aluminate phosphor in an amount of between 3 and 20% by weight, preferably between 5 and 15% by weight, of the phosphor composition and a europium-doped strontium-barium-calcium chloroapatite phosphor forming between 20 and 35% by weight, preferably between 25 and 32% by weight, of the phosphor composition.

The phosphor composition is preferably applied in the form of a single phosphor mixture to the inner side of the discharge vessel and in this case comprises a single layer. However, it may also be advantageous for the phosphor coating to be applied in the form of a plurality of layers.

In addition, a protective layer of $Al_2O_3$, $Y_2O_3$ or a rare earth oxide may be applied between the inner side of the discharge vessel and the phosphor layer or layers.

DESCRIPTION OF THE DRAWINGS

The FIGURE shows the spectrum of a phosphor composition consisting of 38% by weight of europium-doped yttrium oxide phosphor, 32% by weight of cerium- and terbium-doped lanthanum phosphate phosphor, 15% by weight of europium-doped barium-magnesium aluminate phosphor and 15% by weight of manganese- and europium-doped barium-strontium-magnesium aluminate phosphor, with the relative intensity plotted against the wavelength in nm.

DETAILED DESCRIPTION OF THE INVENTION

In the text which follows, the invention is to be explained in more detail on the basis of exemplary embodiments.

Therefore, a phosphor composition according to the invention is considered in more detail for a T8 fluorescent lamp with a tube diameter of 26 mm and a power consumption of 58 W.

The phosphor layer on the inner wall of the tubular discharge vessel consists of 38% by weight of europium-doped yttrium oxide phosphor, 32% by weight of cerium- and terbium-doped lanthanum phosphate phosphor, 15% by weight of europium-doped barium-magnesium aluminate phosphor and 15% by weight of manganese- and europium-doped barium-strontium-magnesium aluminate phosphor.

The fluorescent lamp has a color temperature of 8000 K and a color rendering index of greater than 80. This coating produces a circadian factor of 1.0.

The spectrum of the phosphor composition of this lamp is plotted in the FIGURE, which shows the relative intensity with respect to the wavelength in nm.

A phosphor composition which contains a manganese- and europium-doped barium-magnesium aluminate phosphor as blue-green phosphor preferably comprises the following proportions by weight:

37% by weight of yttrium oxide: Eu

30% by weight of lanthanum phosphate: Ce, Tb

16% by weight of barium-magnesium aluminate: Eu

16% by weight of barium-magnesium aluminate: Mn, Eu

The following percentages by weight result for a phosphor composition according to the invention with europium-doped strontium aluminate as green-blue phosphor component:

37% by weight of yttrium oxide: Eu

30% by weight of lanthanum phosphate: Ce, Tb

26% by weight of barium-magnesium aluminate: Eu

7% by weight of strontium aluminate: Eu

The following weight composition results in the case of strontium borophosphate doped with europium as blue-green fourth phosphor component:

39% by weight of yttrium oxide: Eu

28% by weight of lanthanum phosphate: Ce, Tb

26% by weight of barium-magnesium aluminate: Eu

7% by weight of strontium borophosphate: Eu

The following composition has proven optimum when using barium-magnesium aluminate doped with manganese and europium and strontium-barium-calcium chloroapatite doped with Eu as blue-green components and omitting barium-magnesium aluminate doped with Eu as blue component:

37% by weight of yttrium oxide: Eu

28% by weight of lanthanum phosphate: Ce, Tb

7% by weight of barium-magnesium aluminate: Mn, Eu

28% by weight of strontium-barium-calcium chloroapatite: Eu

The invention claimed is:

1. A phosphor composition for a low-pressure discharge lamp with a color rendering index $R_a$ greater than 80 and a high color temperature of 8000 K to 20.000 K, the phosphor composition comprising
   phosphors which emit in the red wavelength region and which comprise yttrium oxide doped with europium,
   phosphors which emit in the green wavelength region and which comprise lanthanum phosphate doped with cerium and terbium, and
   at least one phosphor which emits in the blue or blue-green wavelength region, wherein
   said europium-doped yttrium oxide forms between 30 and 50% by weight of the phosphor composition,
   said cerium- and terbium-doped lanthanum phosphate phosphor forms between 22 and 40% by weight of the phosphor composition, and
   said at least one phosphor which emits in the blue or blue-green wavelength region comprises
      barium-strontium-magnesium aluminate doped with manganese and europium forming between 10 and 20% by weight of the phosphor composition; or
      barium-magnesium alum mate doped with europium and manganese forming between 7 and 35% by weight of the phosphor composition; or
      strontium aluminate doped with europium forming between 3 and 15% by weight of the phosphor composition; or
      strontium borophosphate doped with europium forming between 3 and 15% by weight of the phosphor composition; and
   wherein
      the phosphor composition further comprises barium-magnesium aluminate doped with europium forming between 10 and 20% by weight of the phosphor composition as an additional phosphor emitting in the blue wavelength region.

2. The phosphor composition of claim 1, wherein said europium-doped yttrium oxide forms between 35 and 41% by weight of the phosphor composition.

3. The phosphor composition of claim 1, wherein said phosphors which emit in the red wavelength region further comprise cerium- and manganese-doped gadolinium-zinc-magnesium pentaborate forming between 5 and 30% by weight of the phosphor composition.

4. The phosphor composition of claim 1, wherein said cerium- and terbium-doped lanthanum phosphate forms between 30 and 34% by weight of the phosphor composition.

5. The phosphor composition of claim 1, wherein said manganese- and europium-doped barium-strontium-magnesium aluminate forms between 13 and 17% by weight of the phosphor composition.

6. The phosphor composition of claim 1, wherein said europium- and manganese-doped barium-magnesium aluminate forms between 10 and 30% by weight of the phosphor composition.

7. The phosphor composition of claim 1, wherein said europium-doped strontium aluminate forms between 4 and 10% by weight of the phosphor composition.

8. The phosphor composition of claim 1, wherein said europium-doped strontium borophosphate forms between 4 and 10% by weight of the phosphor composition.

9. A phosphor composition for a low-pressure discharge lamp with a color rendering index $R_a$ greater than 80 and a high color temperature of 8000 K to 20.000 K, the phosphor composition comprising
   phosphors which emit in the red wavelength region and which comprise yttrium oxide doped with europium,
   phosphors which emit in the green wavelength region and which comprise lanthanum phosphate doped with cerium and terbium, and
   at least one phosphor which emits in the blue or blue-green wavelength region, wherein
   said europium-doped yttrium oxide forms between 30 and 50% by weight of the phosphor composition,
   said cerium- and terbium-doped lanthanum phosphate phosphor forms between 22 and 40% by weight of the phosphor composition, and
   said at least one phosphor which emits in the blue or blue-green wavelength region comprises europium- and manganese-doped barium-magnesium aluminate phosphor forming between 7 and 20% by weight of the phosphor composition, and wherein said phosphor which emits in the blue or blue-green wavelength region further comprises europium-doped strontium-barium-calcium chloroapatite forming between 20 and 35% by weight of the phosphor composition.

10. The phosphor composition of claim 1, wherein said phosphors which emit in the green wavelength region further comprise cerium-magnesium aluminate doped with terbium and/or comprise cerium-magnesium pentaborate doped with terbium.

11. A low pressure discharge lamp comprising a discharge vessel having an inner surface wherein at least one layer of phosphor composition is arranged on said inner surface, said phosphor composition having a color rendering index $R_a$ greater than 80 and a high color temperature of 8000 K to 20.000 K and said phosphor composition comprising
   phosphors which emit in the red wavelength region and which comprise yttrium oxide doped with europium,
   phosphors which emit in the green wavelength region and which comprise lanthanum phosphate doped with cerium and terbium, and
   at least one phosphor which emits in the blue or blue-green wavelength region, wherein
   said europium-doped yttrium oxide forms between 30 and 50% by weight of the phosphor composition,
   said cerium- and terbium-doped lanthanum phosphate phosphor forms between 22 and 40% by weight of the phosphor composition, and
   said at least one phosphor which emits in the blue or blue-green wavelength region comprises
      barium-strontium-magnesium aluminate doped with manganese and europium forming between 10 and 20% by weight of the phosphor composition; or
      barium-magnesium aluminate doped with europium and manganese forming between 7 and 35% by weight of the phosphor composition; or
      strontium aluminate doped with europium forming between 3 and 15% by weight of the phosphor composition; or
      strontium borophosphate doped with europium forming between 3 and 15% by weight of the phosphor composition; and wherein
the phosphor composition further comprises barium-magnesium aluminate doped with europium forming between 10 and 20% by weight of the phosphor composition as an additional phosphor emitting in the blue wavelength region.

12. A low pressure discharge lamp comprising a discharge vessel having an inner surface wherein at least one layer of phosphor composition is arranged on said inner surface, said phosphor composition having a color rendering index $R_a$ greater than 80 and a high color temperature of 8000 K to 20.000 K and said phosphor composition comprising phosphors which emit in the red wavelength region and which comprise yttrium oxide doped with europium, phosphors which emit in the green wavelength region and which comprise lanthanum phosphate doped with cerium and terbium, and at least one phosphor which emits in the blue or blue-green wavelength region, wherein said europium-doped yttrium oxide forms between 30 and 50% by weight of the phosphor composition, said cerium- and terbium-doped lanthanum phosphate phosphor forms between 22 and 40% by weight of the phosphor composition, and said at least one phosphor which emits in the blue or blue-green wavelength region comprises europium- and manganese-doped barium-magnesium aluminate phosphor forming between 7 and 20% by weight of the phosphor composition, and wherein said phosphor which emits in the blue or blue-green wavelength region further comprises europium-doped strontium-barium-calcium chloroapatite forming between 20 and 35% by weight of the phosphor composition.

* * * * *

UNITED STATES PATENT AND TRADEMARK OFFICE
CERTIFICATE OF CORRECTION

PATENT NO. : 7,670,507 B2 Page 1 of 1
APPLICATION NO. : 11/547068
DATED : March 2, 2010
INVENTOR(S) : Armin Konrad and Martin Zachau It is certified that error appears in the above-identified patent and that said Letters Patent is hereby corrected as shown below:

Column 4, line 36, delete "comprises" and insert in place thereof --consists of--
Column 5, line 31, delete "alum mate" and insert in place thereof --aluminate--

Signed and Sealed this

Sixth Day of July, 2010

David J. Kappos
*Director of the United States Patent and Trademark Office*